United States Patent [19]
Smith

[11] 3,727,345
[45] Apr. 17, 1973

[54] METHOD OF PROTECTING PLANTS AND STIMULATING THEIR GROWTH

[76] Inventor: Norman J. Smith, 33 Chestnut Drive, Apt. 113, Vineland, N.J. 08360

[22] Filed: Oct. 28, 1970

[21] Appl. No.: 84,645

[52] U.S. Cl. ............................47/2, 47/29, 239/269
[51] Int. Cl. .........................A01g 13/06, A01g 13/02
[58] Field of Search........................47/2, 17, 1, 9, 26, 47/29; 239/269

[56] References Cited

UNITED STATES PATENTS

| | | | |
|---|---|---|---|
| 3,205,619 | 9/1965 | Henry | 47/9 |
| 3,206,892 | 9/1965 | Telkes et al. | 47/29 |
| 3,361,359 | 1/1968 | Chapin | 239/269 X |
| 3,446,272 | 5/1969 | Gaines | 47/17 X |

FOREIGN PATENTS OR APPLICATIONS

| | | |
|---|---|---|
| 864,372 | 4/1961 | Great Britain |
| 1,237,283 | 6/1960 | France |
| 1,509,448 | 12/1967 | France |
| 290,648 | 6/1965 | Netherlands |

*Primary Examiner*—Robert E. Bagwill
*Attorney*—James A. Eisenman and Robert R. Strack

[57] ABSTRACT

There is disclosed a structure for stimulating the growth of plants in the outdoors and particularly for protecting the plants from frost or excessive heat. Plastic film tubes with apertured side walls are disposed between crop rows, water-ballasted, and continuously filled with air which is vented from the sides onto the plants. The vented air is tempered by the thermal mass of the ballast water which can be made to absorb heat from the sun for distribution to the plants during periods of low temperature.

9 Claims, 7 Drawing Figures

INVENTOR.
NORMAN J. SMITH

BY Eisenman & Strack

ATTORNEYS.

PATENTED APR 17 1973 3,727,345

INVENTOR.
NORMAN J. SMITH

BY *Sweeman n Strack*

ATTORNEYS.

METHOD OF PROTECTING PLANTS AND STIMULATING THEIR GROWTH

BACKGROUND OF THE INVENTION

The invention is concerned with apparatus and methods for protecting plants and stimulating their growth, particularly in hostile environments.

From the beginning of the science of agriculture, attempts have been made to achieve plant growth in the face of adverse climate conditions. Typical among these are greenhouses, plastic planting tubes, individual plant shields, and fogging means. Such techniques are costly, either to install or to maintain, or both, and the quality of the plants is often below those grown in open air under more suitable conditions. The present invention represents a simple, inexpensive and highly effective approach to the problem of plant protection in open air under various adverse environmental conditions, including cold, hot, windy, and polluted. The invention also facilitates the treatment of crops, including such functions as irrigating, fumigating, fertilizing and pollinating.

SUMMARY OF THE INVENTION

In accordance with the invention, plastic film is formed into tubes or conduits of substantial size which are disposed between the rows of crops. The tubes are water-ballasted to a shallow depth and inflated pneumatically from a continuous air source to form relatively stable structures. Openings are provided in the sides of the tubes along the rows at spaced intervals to discharge air into the growing areas after it has been exposed to the water ballast. Most water sources are above freezing temperature by 15° or 20° F. so that heat is available for the plants immediately upon installation as ballast. Sunlight, however, raises the temperature of the water significantly to store additional heat for use during cold night hours.

The storage of heat in the ballast water can be augmented by coloring the water and, if desired, this can be done by the introduction of algae and small amounts of fertilizer. In the event the system is to be used to protect against heat, the water is preferably shielded from the sun, and well water is added continuously. If desired, the air flow can also be used as a vehicle to convey vaporized insecticides and fungicides to the plants from a common source at the air inlet. Further, supplemental heat in the form of electric or gas heaters can be used at the inlet for use in extreme environmental conditions and additional water can be added, continuously if desired, as a low level source of heat.

The ballasted tubular structures are highly resistant to wind damage because of their ability to yield under wind stresses. The structure is thus able to protect the plants from winds without blocking their direct exposure to the sun.

As a safeguard against water leaks, shallow dams can be provided along the lengths of the ballasted tubes so that one section might drain in the event of a leak without causing drainage of the entire system. The system, in the event of power failure, simply collapses between the rows without harming the plants and is maintained in position by the water ballast. Thus it is possible to deenergize the fan system during daylight hours or warm periods without rendering the structure vulnerable to winds and without detracting significantly from the ability of the ballast water to absorb solar energy.

BRIEF DESCRIPTION OF THE DRAWINGS

FIG. 4 is a view in side elevation of the air flow and air treating system at its inlet end.

THE PREFERRED EMBODIMENT

Figure 1:
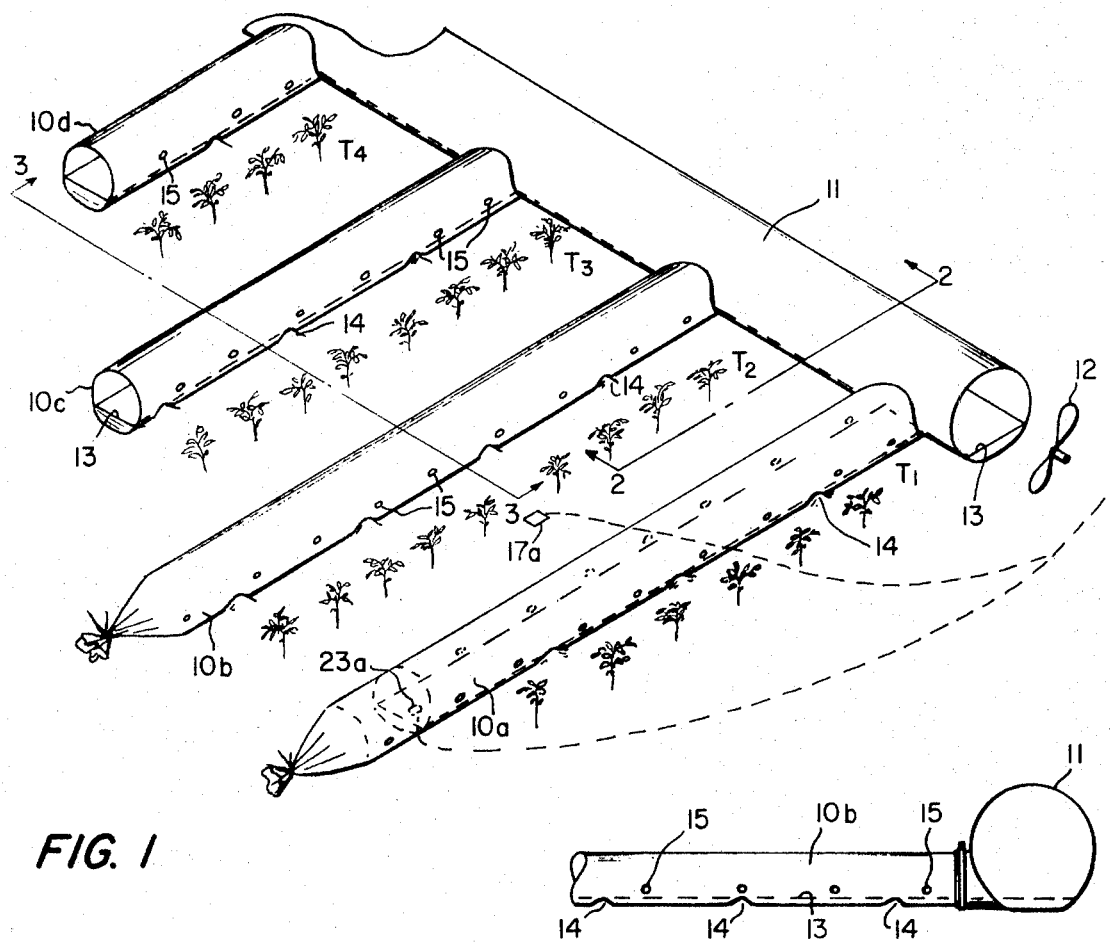
FIG. 1 is a view in perspective, somewhat diagrammatic in nature, of a plant protection system formed in accordance with the present invention.

Referring to the drawings, the invention is illustrated as embodied in a system for facilitating the growth of a food crop, such as tomatoes. The rows $T_1$, $T_2$, $T_3$, etc. of tomato plants are set out in the usual manner in parallel rows. Disposed between the rows are inflated thin-walled transparent plastic tubes 10a, b, c and d, each sealed at one end as by tying and each connected at its other end to a header 11, which can also take the form of an inflated transparent plastic film. The tubes 10a–d are attached to the header as by clamping, stapling, cementing, heat-sealing, or the like, and receive air from the header from a suitable source, such as a fan 12. In a typical installation, a header diameter of 6 ft. using polyethylene plastic film of 6 mils thickness can be used, with the row tubes being formed of similar material in a diameter of approximately 2 ft., with the tubes being spaced apart in the rows by a distance of approximately 5 ft. Different tube sizes and spacing are used for different crops, such as grapes, orchards or the like.

Figure 2:
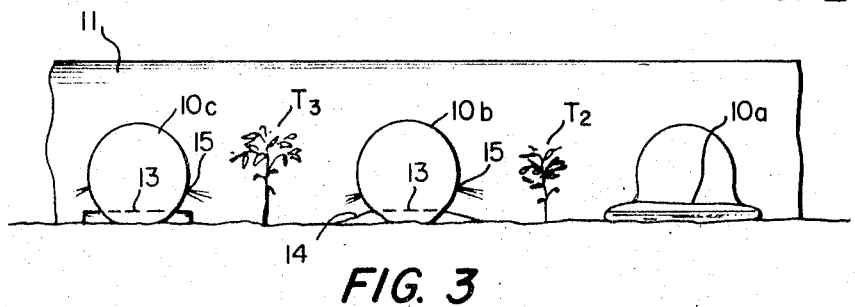
FIG. 2 is a view in side elevation, taken on the line 2—2 of FIG. 1, looking in the direction of the arrows.

Water 13 is introduced into the header and the tubes to a depth of 3 to 5 in., to form ballast for holding the assembly to the soil and to form a heat reservoir. As best seen in FIG. 2, dams or dikes 14 are formed along the lengths of the tubes 10, say, at 10-ft. intervals. This can be accomplished by mounding the earth under the tubes and serves the dual purpose of (1) damming the water in specific sections of the tube so that in the event of a leak only one section will lose its water, and (2) allowing the system to accommodate changes in grade along the length of the tubes without causing water to build up to excessive depths at any point. To achieve the latter feature, it is desirable that the header be disposed at the high end of the rows so that water can be introduced through the header from a common source.

The action of the ballast in holding the tube in position on the soil should be contrasted with a rigid mounting system in which plastic sheeting is lashed on a fixed framework. Under severe loading conditions imposed, for example, by high winds, high stresses, and hence tearing, can result at such fixed mounting points. On the other hand, the water ballast, coupled with pneumatic inflation, renders the entire structure yieldable at all points so that stresses are distributed. High winds, therefore, even under extreme conditions, tend only to distort the fully compliant tube assembly without initiating tears.

By locating the air venting holes above the center line it is possible to turn off the air pressure source 12 during periods of benign climate without significant loss of ballast water. The plastic tube, whether inflated or collapsed, forms a mulch between planting rows which both conserves ground moisture and restricts the growth of weeds.

Figure 3:
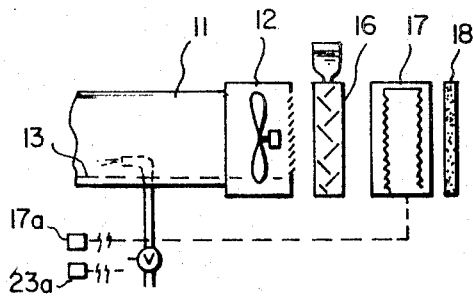
FIG. 3 is a view in vertical section, taken on the line 3—3 of FIG. 1, looking in the direction of the arrows.

Disposed along the length of each tube 10a–d are air-discharge holes 15 located slightly below the horizontal plane passing through the center line of the tubes (as best seen in FIG. 3) so that air is discharged from the tubes with a slight downward component. The discharge holes 15 in the illustrated embodiment are spaced apart along the row lengths by approximately 6 ft. and the holes in adjacent tubes are arranged (as best seen in FIG. 1) to be out of register by a factor of approximately 3 ft. In this fashion, air is discharged into the planting row first from one side and then from the other progressively along its length. In a representative installation, air-discharge holes of 1½ in. in diameter were provided, and the inflation of the tubes was such that approximately 20 cu. ft. per minute discharged from each hole.

The storage of solar energy in the ballast water can be increased by adding coloring material to the water to absorb radiant energy. In accordance with the invention, artificial coloring materials can be added or, as a preferred method, a combination of algae together with small amounts of fertilizer can be introduced into the ballast water to establish algae growth coloring the water. This not only results in the absorption of additional sunlight due to the opaque character of the water, but the algae growth itself is a generator of heat.

If desired, additional plant fertilization of this type can be introduced at the air inlet adjacent the fan 12. Also, fungicides and insecticides can be introduced to the crop through the pneumatic system via vaporizable or other air-borne materials. These can be introduced, for example, through a porous medium, gridwork, spray or the like indicated generally by the numeral 16. Also, for extreme weather conditions, supplemental heat from means such as a gas or electric heater 17, can be included at the air inlet or in the water system, using either fresh or recirculated heated water. A continuous infusion of well water from a pump can also be used as a source of low level heat. Such supplemental heater or water pump or both can be linked to a thermostat 17a disposed within a central growing area to be energized when the temperature falls below a predetermined point. The thermostat can be used to control the inflation of the entire system, turning it on under low temperature conditions. In general, it is preferred that the system remain in operation because it has been found that the constant circulation of air around the plants stimulates growth not only by furnishing warmth, but by maintaining dry conditions and otherwise keeping air pollutants or disease spores from falling on the plant leaves due to positive pressure and motion of the air. In the case of proximity to sources of air pollution, an air filter 18 can be provided at the air inlet.

To reduce sky radiation on cold nights, fog or smoke can be introduced into or formed in the tubes to both conserve heat in the water and to act in the manner of smudgepots when discharged around the plants. Also, portions of the tubes which are not in the sweep of the sun can be made opaque or aluminized to reduce sky radiation away from the directions of the solar sweep and to reflect additional solar radiation into the water.

FIRST MODIFIED EMBODIMENT

Figure 5:
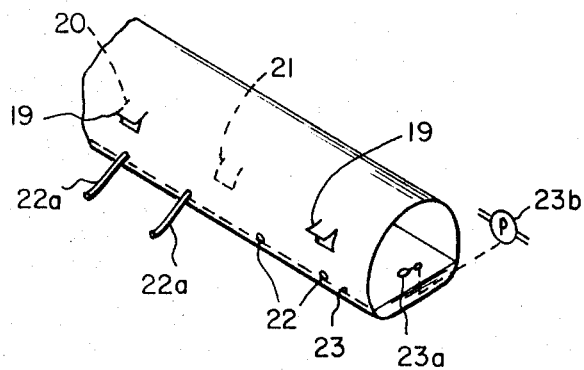
FIGS. 5, 6 and 7 illustrate modifications of the invention.

As shown in FIG. 5, the air-discharge openings for discharging air into the plant rows can take the form of deflector flaps 19 punched out of, or attached to the tube wall. If deflector flaps are used, the location of the discharge openings can be somewhat higher on the tube wall without loss of ability to discharge the air with a downward component toward the planting rows. In accordance with the invention, the air discharge openings can be made of selectively adjustable size by means of score marks 20 formed in the tube wall so that the operator can create openings of various sizes by tearing progressively larger areas of the plastic sheet. It will be understood that this expedient can be used either with or without the deflector flap structure, i.e. the entire tear piece can be separated from the tube wall or left in place to form a deflector flap. Also, additional potential openings 21 can be provided in the tube wall to enable the operator to increase the total volume of air in selected growing areas. The use of increased numbers of openings, or the use of larger openings, or both, can be used to compensate for normally decreased air flow in areas remote from the air source.

If desired, the tube structure can be used for irrigation purposes by providing seepage means in the form of small holes 22, preferably in the vicinity of the normal ballast-water level line 23 in the tube wall. Extension tubes 22a can be provided if it is desired to establish the discharge at points close to the plants. By pumping additional water into the system at the input end to raise the water level above the weep holes, a slow discharge of water can be caused to occur along the rows. The ballast water can also be made to discharge slowly from the tubes to irrigate the crop without the addition of more water by reducing the air pressure to lower the weep holes 22 toward the ground level and below the normal liquid level (FIG. 6B). Complete and rapid water discharge can be effected by allowing the system to collapse. In the latter case, to insure water discharge, the air-discharge holes should be located in the tube below the center line, as described above in connection with FIGS. 1–3. By locating the air holes above center and by eliminating weep holes for the water, the system can be made to retain its water ballast in the event of tube collapse due for example to deliberate or accidental loss of air pressure. The size of the tube is preferably selected in relation to the spacing of the growing rows so, upon collapse, the plants are not smothered. Thus, the system can be reduced in its functions to that of a plastic mulch to suppress weed growth and to conserve ground water. In its inflated mode, however, ground mulching is also achieved but to a lesser extent. It should also be noted that by the use of transparent plastic tubing, solar radiation from the sides, at low angles of the sun, is not kept from the plants.

For continuous irrigation control as well as replenishing lost water, a float control 23a can be located at a strategic point in the system to operate a pump 23b. Water flow can be particularly important in cases in which the system is used for supplying moving, cool air to stimulate fruiting in time of high temperature and still air. It will be understood that a system used exclusively for cooling purposes will use larger amounts of water and preferably the upper surface of the tube is made opaque or reflective (as by an aluminized coating) to keep the water cool.

SECOND MODIFIED EMBODIMENT

Figure 6:
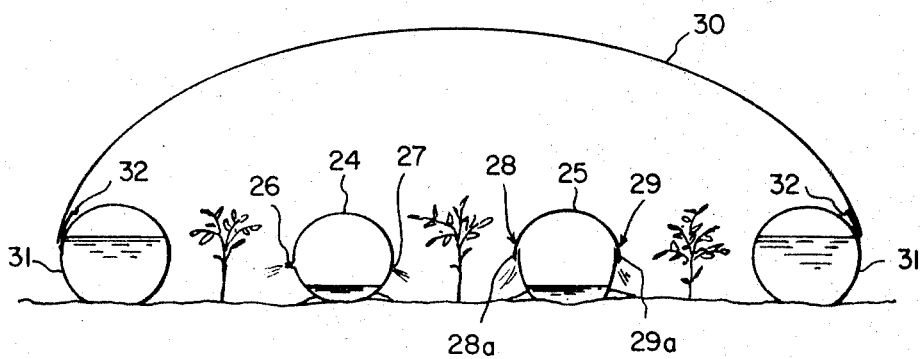

Referring to FIG. 6, other forms of the invention are illustrated. Whereas the tubes 10a, 10b, 10c, etc. of FIG. 1 are in the form of extruded, thin-film plastic tubes, fabricated tube structures 24 and 25 are illustrated in FIG. 6. The tube 24 is formed from a single strip of transparent sheet plastic material joined in a longitudinal, outwardly facing seam 26 which can be formed, for example, by heat-sealing, stapling, clamping or adhesively joining the plastic sheet at longitudinally spaced points so that air-discharge holes appear along the length corresponding to the spacing of the air-discharge holes in the tubular structure of FIGS. 1-3. Air-discharge openings 27 can be provided on the other side of the tube, either by cutouts or flap constructions of the type described, for example, in conjunction with FIGS. 1-3.

The tube 25 is formed of two strip sections which are overlapped top over bottom to form longitudinal seams 28 and 29 which, as in the case of the tube 24, can be interrupted at longitudinally spaced points to provide air-discharge openings. The overhanging flaps 28a and 29a of the upper sheet form downward deflectors for the escaping air.

The array of inflated water-ballasted tubes, as pointed out above, forms a wind barrier for protecting the plants. For extreme environmental conditions, or for very early or late season planting, the water-ballasted air tubes can be utilized as a source of air to support an overall covering sheet 30 of thin plastic film which can be secured at its edges either to water-ballasted air tubes at the perimeter of the planting area or to other supporting means. The air discharged from the inner array of tubes creates a positive pressure within the covering sheet 30 which vents to the atmosphere at a metered rate to maintain the structure. The covering 30 can be formed with relatively low overhead for newly planted crops or higher overhead for larger crops or for affording access to the crops by workers. A low profile is advantageous for heavy wind conditions. In the event of snow loading, the covering sheet 30 will be pressed down on the tubes to find additional support across the planting area.

As one preferred method for securing the covering sheet, heavily water-ballasted tubes 31 can be provided at the perimeter of the planting area, the tubes 31 being formed with upwardly extending flaps 32 to which the covering sheet 30 is attached, as by stapling, clamping, snapping, lashing or the like. The attachment between the flap 32 and the covering sheet 30 can be continuous or air-tight. In the latter case, the air is vented through other means. By providing interrupted joinings between the flap 32 and the covering sheet 30, spaced air vents will be provided to discharge air out of the structure to maintain the desired continuous flow. The heavily ballasted tubes 31 form additional protective barriers for the inner tubes and for the crops. The shock of severe wind loading tends to be absorbed by the compliance of the liquid ballast. The tubes 31 can be air-inflated or not as desired. The covering sheet 30 can be removed as the climate improves in the course of the growing season.

THIRD MODIFIED EMBODIMENT

Figure 7:
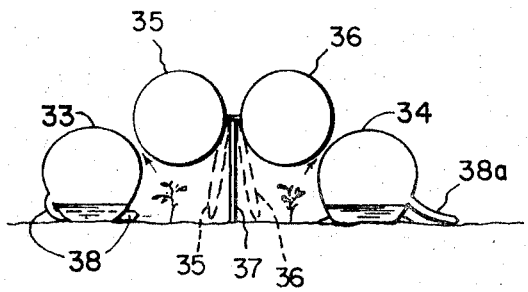

Referring to FIG. 7, there is illustrated an arrangement in which the overhead space between adjacent tubes 33 and 34 and over one or two planting rows can be selectively covered by means of a pair of collapsible tubes 35 and 36 attached to a support 37 and connected to the air pressure source through a selector valve (not shown). The tubes 35 and 36 are preferably imperforate and, when inflated, form a cover over the crop row, supported partially by their own pneumatic pressure and partially by the discharged air from the primary tubes, with venting to the atmosphere occurring between the tubes as shown by the arrows. Deflation causes the tubes to collapse, as shown in broken lines, and to hang between the primary tubes. Rearrangement of crop rows as by offsetting from the central line is preferred. To augment heat transfer between discharged air and water, venting tubes 38 can be connected to the primary tubes at points slightly above the water level and passed under the primary tubes to discharge the warmed air at ground level at points closely spaced to the plants. Because the tubes 38 pass under the primary tubes, they can also serve as dams or water barriers similar to the dams 14 shown in FIG. 2. The tubes 38 can also be used as a direct venting means at ground level and close to the plants without passing beneath the primary tubes, as indicated by the numeral 38a.

While preferred embodiments of the invention have been described and illustrated above, it will be understood that the invention can take various other forms and arrangements within the scope of the art. Thus, for example, fixed header structures can be used. Also, supplemental air can be introduced at various points in the system. Water can be introduced at different points from the air, but almost invariably at a high point in the system. Also, pollen can be introduced into the air stream to augment fertilization, and ground fertilizers can be introduced through the irrigation water. The invention should not, therefore, be regarded as limited except as defined in the appended claims:

I claim:

1. In a method of protecting growing plants from adverse environmental conditions, the steps of disposing water within inflatable tubes between growing rows, introducing a relatively large volume of air into the tubes to inflate them to form a lateral barrier against wind, and venting the air from the tubes laterally toward the growing plants at a plurality of points spaced along the growing rows thereby to establish a flow of air over the water to condition the vented air, and exposing the water to solar radiation in situ to raise the temperature thereof to furnish heat for the flowing air.

2. The method according to claim 1, including coloring the water to augment its solar absorption.

3. The method according to claim 1, including the step of introducing plant-treating materials in airborne form into the tubes together with the source of air.

4. The method according to claim 1, including the step of disposing air-borne particles in the tubes to render the air at least partially opaque to the passage of radiant energy.

5. The method according to claim 1, including the step of maintaining the ballast water at temperatures below ambient atmosphere under warm weather conditions, and utilizing the air discharge to stimulate growth.

6. The method according to claim 1, including the step of establishing shallow dams at spaced intervals along the lengths of the tubes to isolate successive segments of water from each other.

7. The method according to claim 1, including anchoring a thin flexible transparent sheet over the tubes to create an air pocket thereabove to cause the air discharged from the tubes to support the sheet, and controlling the discharge of air from the space beneath the sheet to the atmosphere to establish a positive pressure therein to maintain the sheet in an elevated position above the plants.

8. Apparatus for the protection of plants from adverse environmental conditions and for stimulating plant growth, comprising a plurality of inflatable tubes adapted to be disposed between growing rows, said tubes being imperforate on their lower sides to contain liquid to anchor the tubes in position on the ground as a ballast and to serve as a thermal medium, means in fluid communication with said tubes to introduce and maintain said liquid therein, means defining a plurality of air-discharge openings in a row in the sides of the tubes above the liquid level to discharge air from the tubes toward the respective plants in the row of growing plants, said tubes including at least one air-input opening of substantially larger size than the output openings for the introduction of air under positive pressure into the tubes for inflation thereof and for establishing a flow of moving air over the water, whereby the thermal energy exchange between air and water conditions the air for discharge into the growing area, said tubes being transparent to solar energy at least on the upper surface, thereby to receive thermal energy during daylight hours to heat the liquid to furnish heat to the growing areas through heat exchange with the moving air, and a supplemental cover of thin flexible sheet material overlying at least one growing row and secured to tubes adjacent growing rows, and means in said sheet material defining air-vent openings to the atmosphere from the space under the supplemental cover to maintain a positive pressure in the space, whereby the supplemental cover is supported at least partially by the air discharged from the tubes.

9. Apparatus for the protection of plants from adverse environmental conditions and for stimulating plant growth, comprising a plurality of inflatable tubes adapted to be disposed between growing rows, said tubes being imperforate on their lower sides to contain liquid to anchor the tubes in position on the ground as a ballast and to serve as a thermal medium, means defining a plurality of air-discharge openings in a row in the sides of the tubes above the liquid level to discharge air from the tubes toward the respective plants in the row of growing plants, said tubes including at least one air-input opening of substantially larger size than the output openings for the introduction of air under positive pressure into the tubes for inflation thereof and for establishing a flow of moving air over the water, whereby the thermal energy exchange between air and water conditions the air for discharge into the growing area, said tubes being transparent to solar energy at least on the upper surface, thereby to receive thermal energy during daylight hours to heat the liquid to furnish heat to the growing areas through heat exchange with the moving air, water weep holes formed in the tube walls below the air openings and in the vicinity of the normal ballast-water level of the system, thereby to facilitate crop-irrigation by changing the water level of the ballast water with respect to the ground level, and extension tube means connected to the weep holes to discharge water closely adjacent the plants.

* * * * *